US011473438B2

(12) United States Patent
Reynolds et al.

(10) Patent No.: US 11,473,438 B2
(45) Date of Patent: Oct. 18, 2022

(54) GROOVED ROTOR CASING SYSTEM USING ADDITIVE MANUFACTURING METHOD

(71) Applicant: HONEYWELL INTERNATIONAL INC., Morris Plains, NJ (US)

(72) Inventors: Bruce David Reynolds, Chandler, AZ (US); John Repp, Gilbert, AZ (US); Peter Hall, Prescott, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 402 days.

(21) Appl. No.: 16/431,368

(22) Filed: Jun. 4, 2019

(65) Prior Publication Data

US 2020/0386111 A1 Dec. 10, 2020

(51) Int. Cl.
*F01D 11/08* (2006.01)
*F01D 25/24* (2006.01)
(Continued)

(52) U.S. Cl.
CPC ................ *F01D 11/08* (2013.01); *F01D 9/04* (2013.01); *F01D 25/24* (2013.01); *F04D 29/526* (2013.01); *F04D 27/009* (2013.01); *F05D 2220/323* (2013.01); *F05D 2230/30* (2013.01); *F05D 2230/60* (2013.01)

(58) Field of Classification Search
CPC . F01D 9/04; F01D 11/08; F01D 25/24; F01D 25/28; F05D 2230/30; F05D 2230/60; F05D 2240/11; F04D 27/009; F04D 29/526
See application file for complete search history.

(56) References Cited

U.S. PATENT DOCUMENTS 4,540,335 A * 9/1985 Yamaguchi ............. F01D 11/08 415/173.1
5,762,470 A * 6/1998 Gelmedov .......... F04D 29/4213 415/173.1
(Continued)

FOREIGN PATENT DOCUMENTS

EP 3081779 A1 10/2016
EP 3290649 A1 3/2018

OTHER PUBLICATIONS

Zhou, X., Zhao, Q., Cui, W., Xu, J. (2017). Investigation on Axial Effect of Slot Casing Treatment in a Transonic Compressor, Applied Thermal Engineering, Jul. 21, 2017, 53-69, 126.
(Continued)

*Primary Examiner* — Courtney D Heinle
*Assistant Examiner* — Danielle M. Christensen
(74) *Attorney, Agent, or Firm* — Lorenz & Kopf, LLP

(57) ABSTRACT

Rotor systems and methods for improved performance with extended range to stall fabricated through the use of additive manufacturing. A rotor has blades that extend to tips and rotates about an axis. A casing fits over the rotor so that the tips are configured to pass proximate the casing when the rotor rotates. The casing channels a flow stream across the rotor. Grooves are defined in the casing and extend longitudinally at an acute angle relative to the axis. The grooves extend a distance upstream from a leading edge of the blades and over at least a portion of the blade tips so that the blade tips are configured to pass across the grooves when the rotor rotates.

16 Claims, 12 Drawing Sheets

(51) Int. Cl.

| | |
|---|---|
| ***F04D 29/52*** | (2006.01) |
| ***F01D 9/04*** | (2006.01) |
| *F04D 27/00* | (2006.01) |

(56) References Cited

U.S. PATENT DOCUMENTS

| | | | | |
|---|---|---|---|---|
| 6,290,458 | B1 * | 9/2001 | Irie | F01D 5/145 415/119 |
| 6,514,039 | B1 * | 2/2003 | Hand | F01D 11/08 415/119 |
| 6,832,890 | B2 | 12/2004 | Booth | |
| 8,683,811 | B2 * | 4/2014 | Clemen | F04D 29/681 60/782 |
| 8,845,269 | B2 * | 9/2014 | Agneray | F04D 27/0207 415/58.5 |
| 9,243,511 | B2 | 1/2016 | Lee et al. | |
| 10,107,307 | B2 | 10/2018 | Urac et al. | |
| 2002/0122721 | A1 * | 9/2002 | Collins | F01D 25/246 415/173.1 |
| 2003/0152456 | A1 | 8/2003 | Guemmer | |
| 2005/0111968 | A1 * | 5/2005 | Lapworth | F04D 29/526 415/182.1 |
| 2015/0086344 | A1 * | 3/2015 | Guemmer | F04D 29/526 415/174.1 |
| 2015/0337672 | A1 * | 11/2015 | McCaffrey | F01D 11/122 415/173.1 |
| 2016/0010652 | A1 | 1/2016 | Lim et al. | |
| 2017/0152857 | A1 | 6/2017 | Albers et al. | |
| 2017/0159667 | A1 * | 6/2017 | Streit | F04D 29/545 |
| 2018/0231023 | A1 | 8/2018 | Gentry et al. | |
| 2020/0063578 | A1 * | 2/2020 | Notarnicola | B29C 64/153 |

OTHER PUBLICATIONS

Hathaway,Michael D., Passive Endwall Treatments for Enhancing Stability, NASA/TM—2007-214409, Jul. 2017, ARL-TR-3878, U.S. Army Research Laboratory, Glenn Research Center, Cleveland, Ohio.

Zhu, M., Qiang, X., Teng, J., Numerical Loss Analysis on Slot-Type Casing Treatment in a Transonic Compressor Stage. Journal of Theoretical and Applied Mechanics, 2017, 293-306, 55, 1, Warsaw.

Cooper, K., Steele, P., Cheng, B., Chou, K., Contact-Free Support Structures for Part Overhangs in Powder-Bed Metal Additive Manufacturing, Inventions, Nov. 27, 2017, 3(1), 2.

Zeng, K., Pal, D., Teng, C., Stucker, B. E., Evaluations of Effective Thermal Conductivity of Support Structures in Selective Laser Melting, Additive Manufacturing, Aug. 2015, 67-73, 6.

Wang, W., Chu, W., Zhang, H., Kuang, H. Experimental and Numerical Study of Tip Injection in a Subsonic Axial Flow Compressor, Chinese Journal of Aeronautics, Jul. 2016, 907-917, 30(3).

* cited by examiner

GROOVED ROTOR CASING SYSTEM USING ADDITIVE MANUFACTURING METHOD

TECHNICAL FIELD

The present invention generally relates to flow through a cased rotor, and more particularly relates to axially grooved rotor casings fabricated by advanced manufacturing techniques.

BACKGROUND

In rotary equipment such as fans, compressors and turbines, air flow past the rotating elements is influenced by the flow channel as defined by the casing structure surrounding the rotor. Rotor efficiency, and its impact on fuel consumption and performance, is influenced by the area near the rotor tips and the surrounding structure. Clearance around the rotor tips may be the source of significant losses. The rotor tip clearance losses may be magnified when the flowing gas does not follow its intended path and negatively impacts output due to interactions with the surrounding structure's boundary layer. For example, operating conditions may result in reduced surge margin and lower efficiency potential. Complex structures at the rotor-stator interface may improve performance but may be prohibitively difficult to fabricate using conventional manufacturing techniques.

Various types of articles may be created using additive manufacturing processes. Additive manufacture includes processes such as those that create a component or item by the successive addition of particles, layers or other groupings of a material onto one another. The article is generally built using a computer controlled machine based on a digital representation, and includes processes such as 3-D printing. A variety of different additive manufacturing processes are used such as processes that involve powder bed fusion, laser metal deposition, material jetting, or other methods.

It is desirable to create rotor systems using effective, efficient and economical manufacturing methods of rotor system parts. It is also desirable to manufacture rotor systems that have extended performance ranges and for handling increased aerodynamic loadings. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description section hereof. This summary is not intended to identify key or essential features of the claimed subject matter, nor is it intended to be used as an aid in determining the scope of the claimed subject matter.

A number of embodiments include a method of manufacturing a rotor system that may employ additive manufacturing techniques to form complex geometries that result in improved performance. The method includes designing a casing with stall enhancement features. A rotor is fabricated with a number of blades with tips. The rotor is configured to rotate in a flow stream. The casing is constructed to fit over the rotor so that tips of the blades are configured to pass proximate the casing when the rotor rotates about an axis. The casing is formed by additive manufacturing with a series of grooves in the casing. The grooves extend into the casing radially outward relative to the axis and are oriented to extend longitudinally at an acute angle relative to the axis to provide stall enhancement. Aerodynamic performance of the grooves is optimized by analysis to avoid stall. The rotor is assembled in the casing with the grooves extending over at least a portion of the blade tips so that the blade tips are configured to pass across the grooves when the rotor rotates.

Other embodiments include rotor system that includes a rotor with blades that extend to tips. A casing fits over the rotor so that the tips are configured to pass proximate the casing when the rotor rotates. The casing is configured to channel a flow stream across the rotor and includes a section that is formed separate as a number of segments. The segments define a series of grooves that extend into the segments in a radially outward direction relative to the rotor's axis. The grooves are oriented to extend longitudinally at an acute angle relative to the axis. The grooves extend a distance upstream from a leading edge of the blades and over at least a portion of the blade tips so that the blade tips are configured to pass across the grooves when the rotor rotates.

In additional embodiments, a method of manufacturing a rotor system for an engine includes designing a casing with stall enhancement features. A rotor is fabricated with a number of blades. Each has a leading edge, a trailing edge and a tip. The rotor is configured to rotate in a flow stream of the engine. The casing is constructed to fit over the rotor so that blade tips of the rotor are configured to pass proximate a segmented section of the casing when the rotor rotates about an axis, and so that the casing channels the flow stream across the rotor. Size, orientation and shape of the grooves is determined to provide an aerodynamic performance that avoids stall and surge. The segmented section of the casing is formed by additive manufacturing. The segmented section includes the grooves that extend into the casing radially outward from the axis. The rotor is assembled in the segmented sections of the casing with the grooves extending a distance upstream from the blade tips beyond the leading edge and over at least a portion of the blade tips in the axial direction so that the blade tips are configured to pass across the grooves when the rotor rotates.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
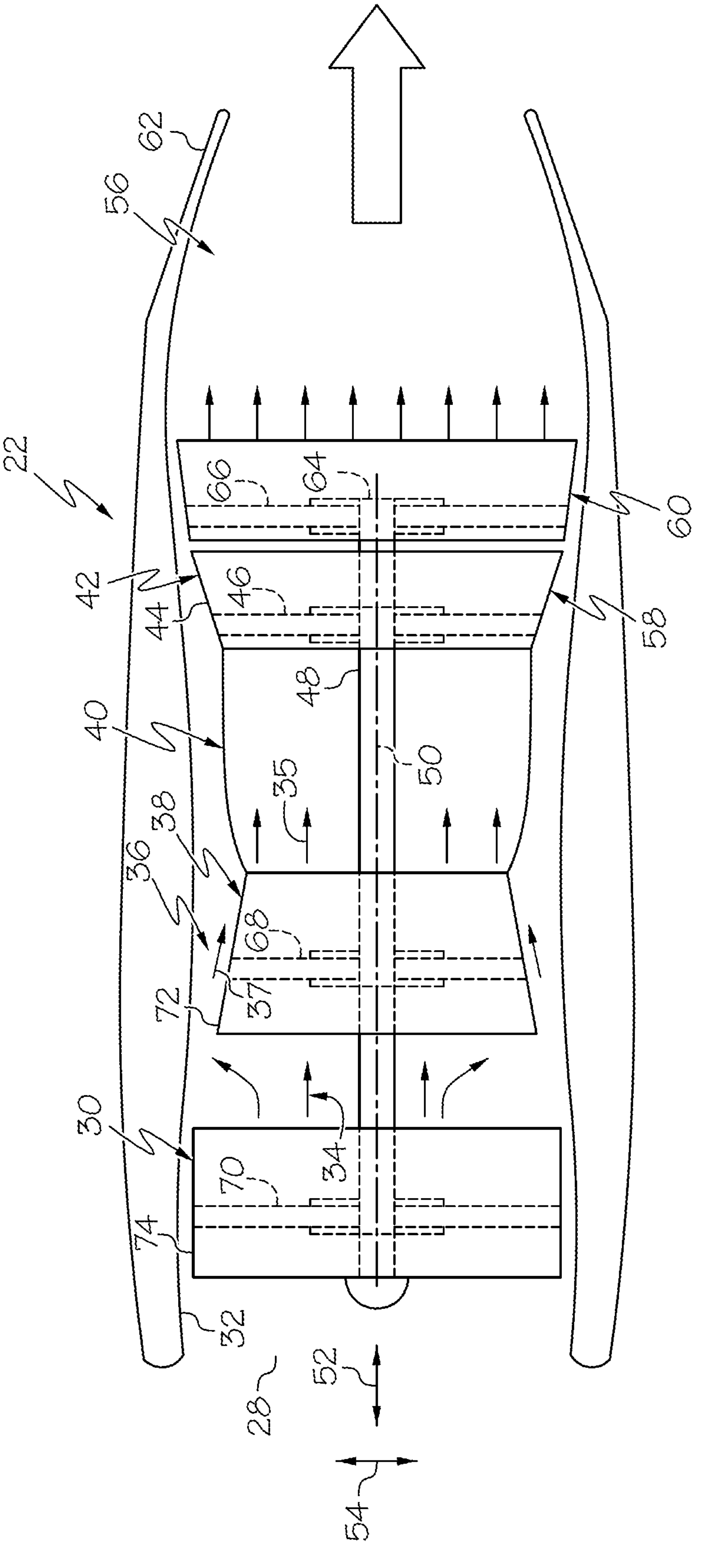
FIG. 1 is a schematic illustration of an engine, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, features such as grooves, passages and channels may be created by using an additive manufacturing process such as direct metal laser sintering (DMLS) to extend the performance characteristics of a rotor system by enabling complex geometry at the rotor-stator interface. Axially oriented casing treatment approaches, including those with recirculation passageways are disclosed herein to provide beneficial performance characteristics. Additive manufacturing has been identified as an enabler for creating these complex parts, which otherwise may be prohibitively difficult to manufacture. In the examples given herein, details may be associated with a specific rotor and engine type, but the disclosure is not limited in application to any specific rotor or any particular type of engine but rather may be applied to any rotor where improved or extended performance is desired. In addition, the disclosure is not limited to any specific additive manufacturing process.

In embodiments of the present disclosure as further described below, systems, structures and methods of manufacturing relate to forming grooves and other features in a casing for a rotor, such as for an engine. Objectives include improving aerodynamic stall margin, efficiency and mechanical requirements. The casing or shroud is formed to fit over the rotor so that blade tips of the rotor are configured to pass proximate a section of the casing when the rotor rotates about an axis. The section may be formed is segments to facilitate manufacture. A series of grooves is formed in the segmented section of the casing. The grooves extend into the casing radially outward from the axis and are oriented such as to extend at angles relative to the axis. Aerodynamic performance as influenced by the grooves is optimized by evaluating alternative depths, orientations and shapes of the grooves to avoid stall and possible engine surge. The segmented sections of the casing may be fabricated by additive manufacturing with the grooves and other features incorporated. The rotor is assembled to rotate within the segmented sections of the casing with the grooves extending a distance upstream from the blade tips and over at least a portion of the blade tips so that the blade tips pass across the grooves when the rotor rotates.

The embodiments disclosed herein enable increased cycle pressure ratios and improved engine performance with higher aerodynamic loadings. Operational stability is extended at narrower surge margins. Stall in state of the art rotors may occur when system surge results in flow that leaks forward through the rotor's tip gap and causes local reverse flow. Reverse axial flow over the tip of a rotor (momentum flux), is a phenomenon associated with the onset of stall. This reverse flow is inhibited in the embodiments disclosed where grooves are employed to create resistance to the reverse flow over the rotor tip and allow the rotor to stably operate with significant increases in range from the operating line to stall. It has been found that additional benefits are realized when the grooves are generally axially oriented so that their longest dimension (length) is generally oriented in the axial direction. This axial orientation is made economically viable by the embodiments described herein, including by utilizing additive manufacturing processes.

As noted above, the grooved casing rotor systems and methods described herein may be employed in a variety of applications, including in a number of embodiments involving an engine. By way of an exemplary embodiment, an engine 22 will be described with reference to FIG. 1. In this embodiment, the engine 22 is configured as a gas turbine engine for aircraft propulsion. The engine 22 includes an intake 28, with a fan section 30 that has a rotor disposed in a fan case 32. The fan section 30 draws air into the engine 22, accelerates the air within the engine 22, and may assist in providing propulsion. The air is directed through two paths that include a core flow through the engine core 34 channeling a flow stream 35, and a bypass flow through a bypass duct 36 channeling another flow stream 37. A compressor section 38 includes a rotor that compresses the air delivered to the engine core 34 and sends it to a combustion section 40. In the combustion section 40 the air is mixed with fuel and ignited for combustion. Combustion air is directed into a turbine section 42, which may include single or plural turbine stages. The hot, high-speed air flows within the turbine case 44 and over the turbine rotors 46, 66 which spin on shafts 48, 64 about an axis 50. The axis 50 defines an axial direction 52, with a radial direction 54 projecting from the axis 50 and normal thereto. The air from the turbine section 42 rejoins that from the bypass duct 36 and is discharged through an exhaust section 56 including through a propulsion nozzle 62.

The turbine section 42 includes one or more turbine stages. In the depicted embodiment, the turbine section 42 includes two turbine stages, a high-pressure turbine 58, and a power turbine 60. However, it will be appreciated that the engine 22 may be configured with a different number of turbine stages. As the turbines 58, 60 rotate, their rotors 46, 66 drive equipment in the engine 22 via concentrically disposed shafts or spools. Specifically, the high-pressure turbine rotor 46 drives the compressor rotor 68 via a high-pressure spool including the shaft 48, and the power turbine rotor 66 drives the fan rotor 70 via a low-pressure spool including the shaft 64. Clearance is provided between each of the rotors 46/66, 68, 70 and their respective casings 44, 72, 74 including to avoid blade incursions during rotation.

Figure 2:
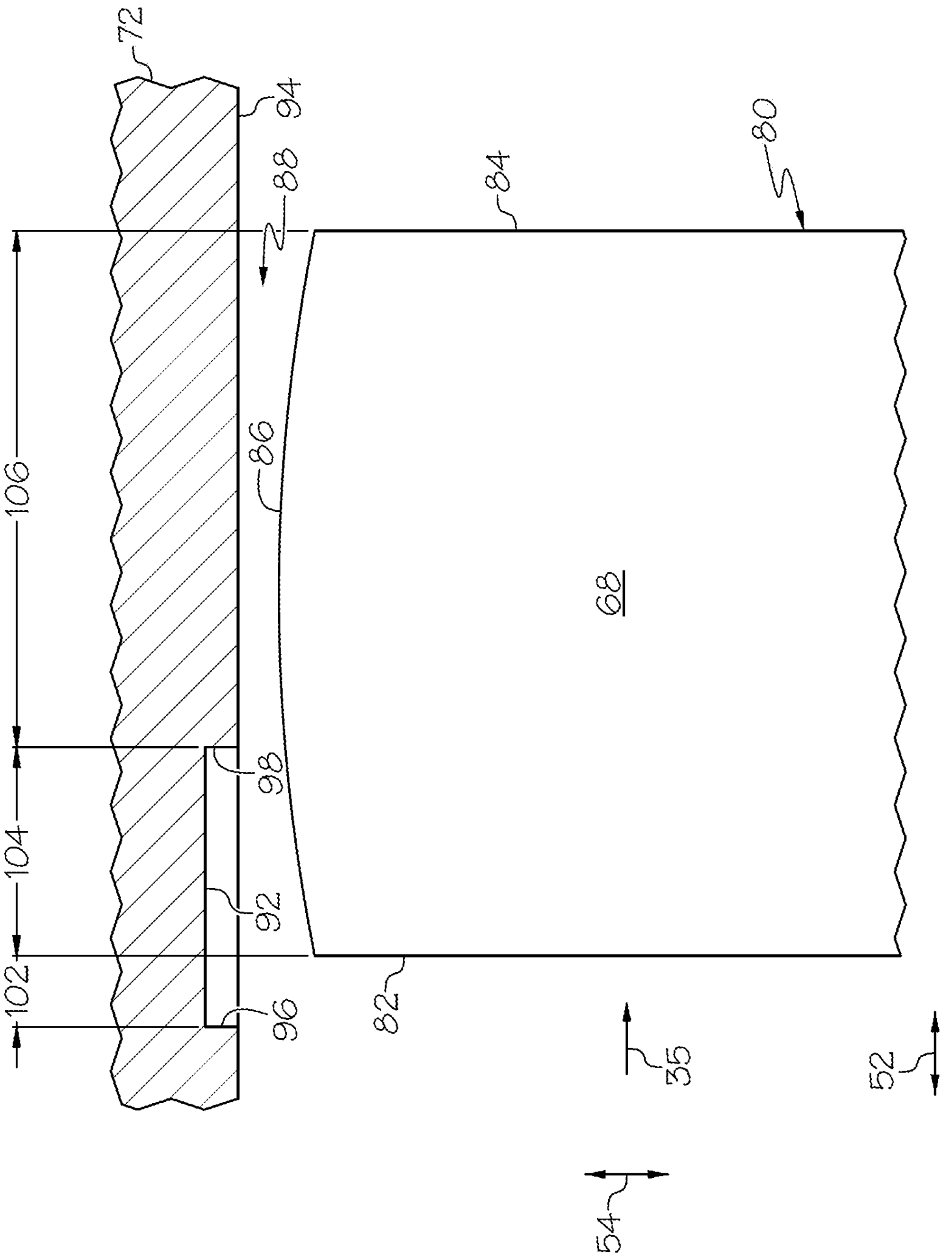
FIG. 2 is a schematic illustration of a rotor blade tip area in longitudinal section, according to an exemplary embodiment.

Referring to FIG. 2, a meridional view of a part of the rotor 68 of the compressor 38 shows the radially outermost part of one blade 80 of the rotor 68. The blade 80 includes a leading edge 82 on its upstream side, a trailing edge 84 on its downstream side and a tip 86. The casing 72 is disposed across a radial clearance gap (i.e. blade running clearance) 88 from the tip 86. It will be appreciated that the casing 72 defines an annular opening within which the rotor 68 is disposed. The radial gap 88 is typically very small, for example, in a range of about 0.25 mm to about 1.50 mm and may be non-dimensionalized by chord. The flow stream 35 from the perspective of FIG. 2 moves from left to right, which coincides with the axial direction 52. In incipient stall conditions, flow may leak through the gap 88 in an upstream direction through the gap 88, which would cause local reverse flow. In this embodiment, reverse flow is inhibited, including by the inclusion of grooves 92 that are formed into the casing 72 from the inner surface 94 and outward in the radial direction 54. The grooves 92 are disposed to extend with their length disposed generally in the axial direction 52 from an upstream end 96 to a downstream end 98. A portion of each groove 92 is disposed radially outward from a portion of the blades 80 and another portion is disposed radially outward from the flow stream 35 upstream from the blades 80. Specifically, the upstream end 96 is disposed a distance 102 upstream from the leading edge 82. The downstream end 98 is disposed a distance 104 downstream from the leading edge 82 and a distance 106 upstream from the trailing edge 84. The distance 104 is greater than the distance 102 and the distance 106 is greater than the distance 104. The stall inhibiting benefits of the grooves 92 has been found to be maximized by the axial orientation where the length of the grooves 92 in the axial direction is greater than their width in the circumferential direction (into the view of FIG. 2).

Figure 3:
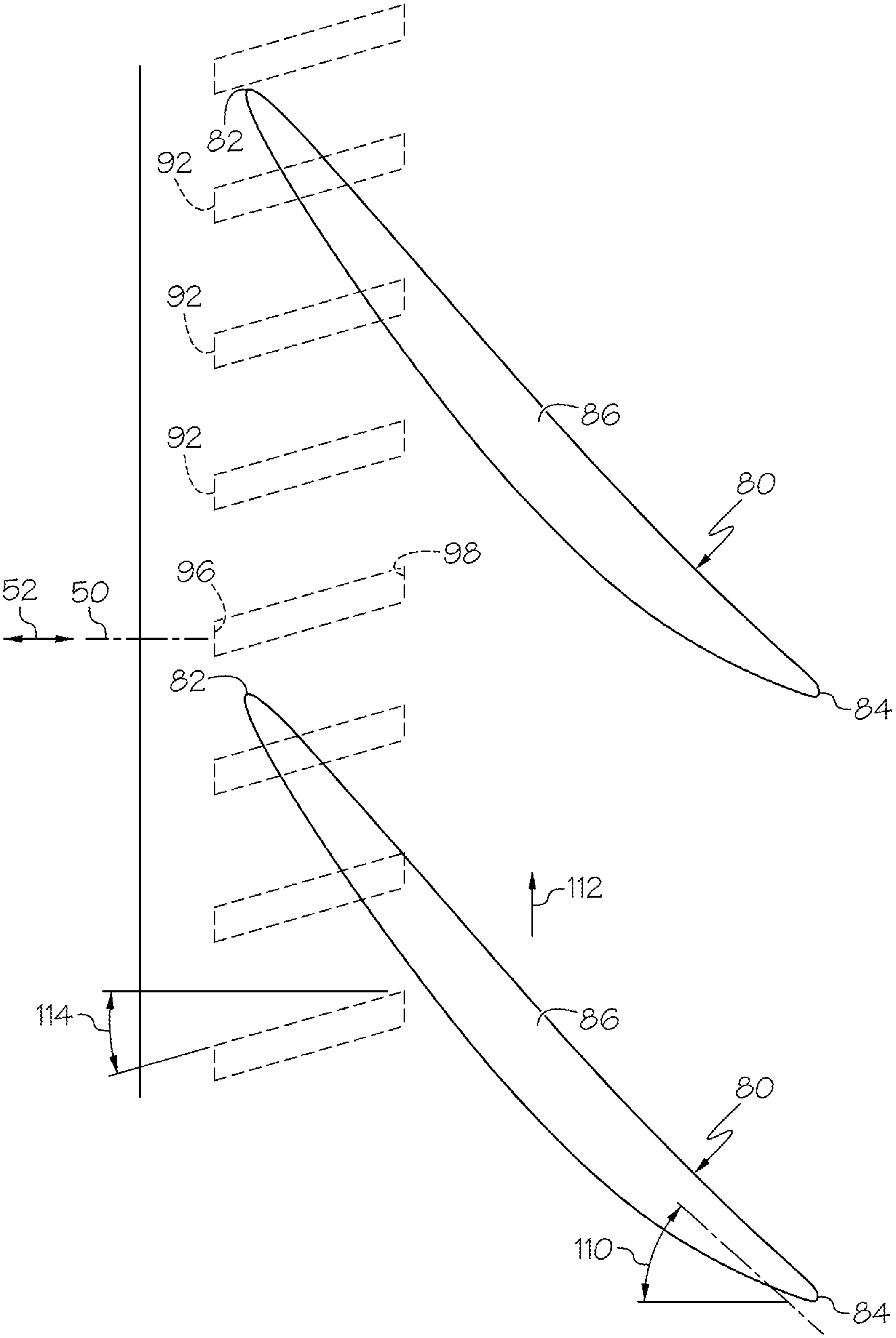
FIG. 3 a schematic illustration of a rotor blade tip area from an axially directed perspective, according to an exemplary embodiment.
Figure 4:
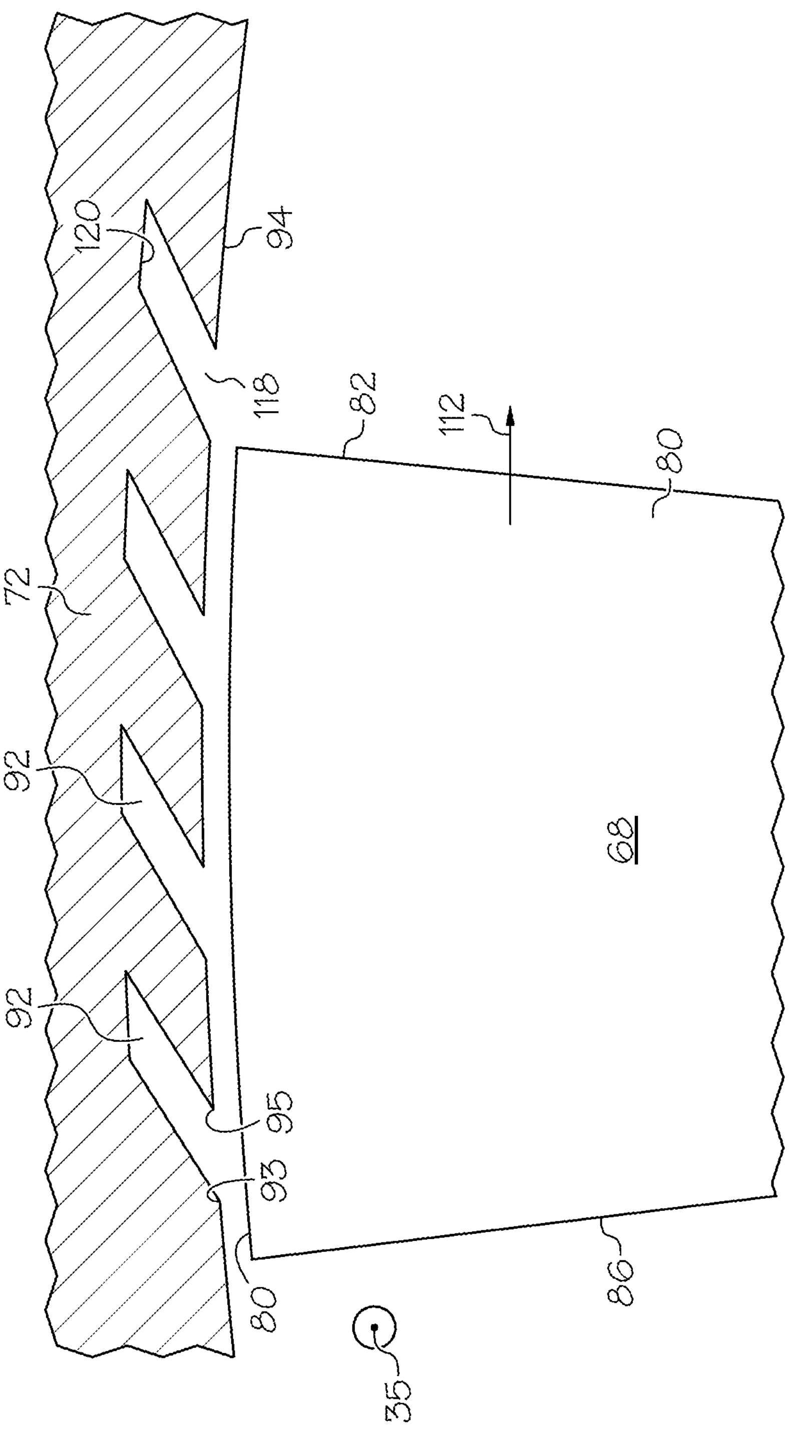
FIG. 4 a schematic illustration of a rotor blade tip area in transverse section, according to an exemplary embodiment.

Referring to FIG. 3, a view of the grooves 92 is provided from a perspective point located radially outward from the blades 80 and toward the blade tips 86. As shown, the grooves 92 span across the leading edges 82 of the blades 80 in the axial direction 52. The blades 80, which have an airfoil shape, are generally disposed at an angle 110 relative to the axis 50 so that the leading edges 82 are disposed before the trailing edges 84 in the rotation direction 112. The grooves 92 are skewed relative to the axis 50 and are disposed at an acute angle 114 relative thereto. The angle 114 is negative relative to the angle 110 and the upstream ends 96 of the grooves 92 are offset further from the axis 50 than the downstream ends 98. As a result, a blade 80 takes a longer period of time to traverse a given groove 92 as compared to if the grooves 92 were disposed axially straight and a right-to-left (as viewed) flow through the grooves 92 is induced. FIG. 4 illustrates the area of the rotor 68 from a perspective point located downstream from the blades 80 and directed into/against the direction of flow stream 35. The grooves 92 are inclined in the rotation direction 112 so that the entry 118 is offset relative to the bottom 120 in a direction against the rotation direction. For example, the leading edge 82 passes the entry 118 of a given groove 92 prior to passing the bottom 120 of that groove 92. The edges of the grooves 92, for example edges 93, 95 at the entry 118 are beveled or rounded to avoid sharp steps that would otherwise disturb airflow. The effect is that a passing blade 80 pushes air through each groove 92 from its downstream end 98 to its upstream end 96. The resulting pressurization works against the formation of counterflow in the gap 88 and extends the surge threshold to higher pressure ratios. The result is that the performance of the rotor 68 is extended, enabling higher efficiencies and power outputs.

The location, orientations and features of the grooves support these performance enhancements. More specifically, the location relative to the blades 80, the skewed and inclined dispositions and the shape each affect the improvements. Volumes of the grooves 92 are adjusted to control the frequency of the inflow/outflow to manage the rotor tip flow-field and to enhance range to stall. The grooves 92 are optimized, such as by modeling and through testing analysis. For example, aerodynamic performance of the grooves 92 is evaluated by testing alternative depths, widths, orientations and shapes of the grooves 92 to avoid compressor stall where flow may otherwise surge forward. For example, the grooves 92 may have curved or complex shapes.

Figure 5:
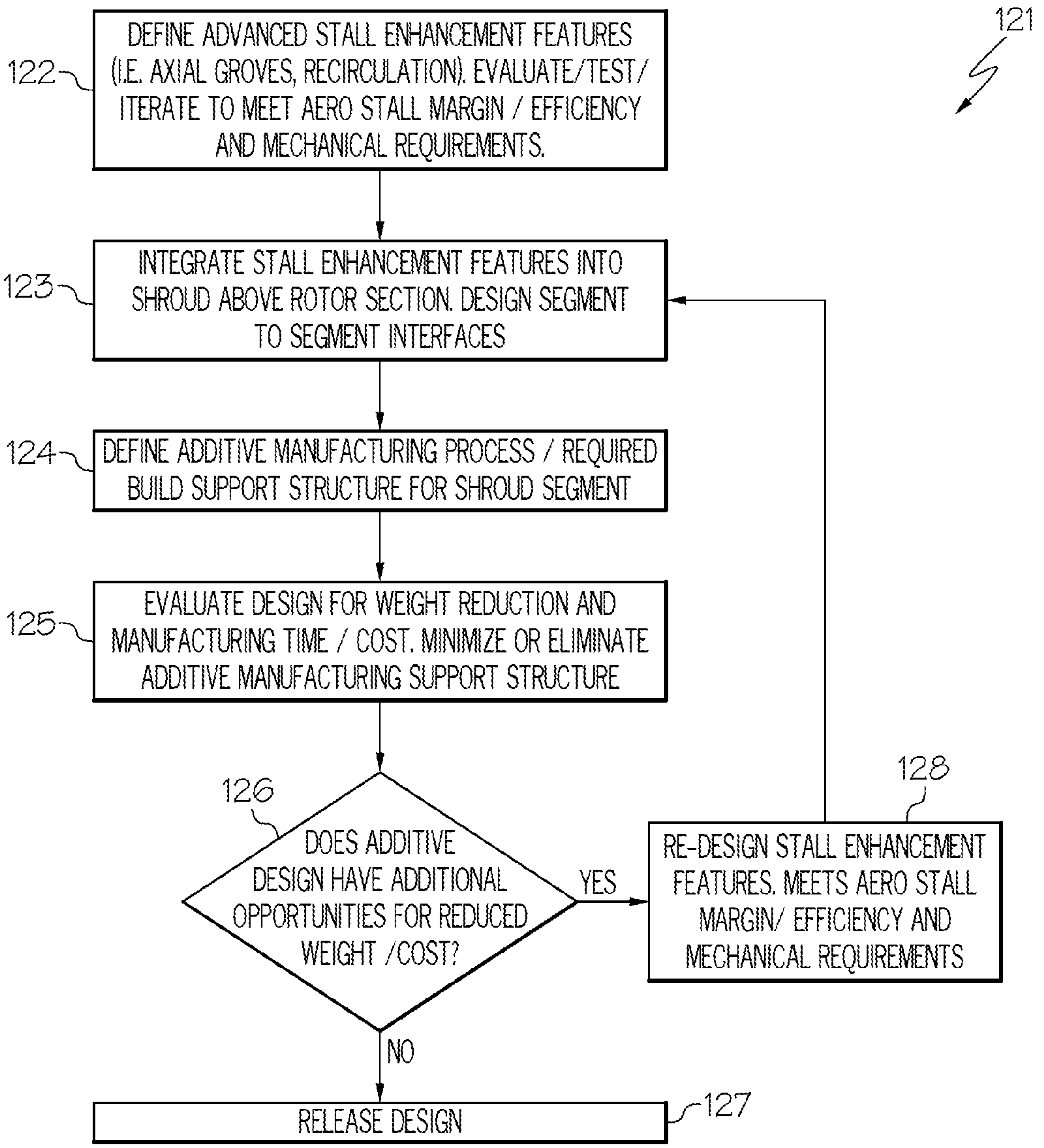
FIG. 5 is a process chart depicting additive manufacture build of a casing with stall enhancement features, according to an exemplary embodiment.

Referring to FIG. 5, a process 121 for manufacturing a rotor casing with complex treatments is defined. The process 121 includes defining, evaluating and iterating 122 advanced stall enhancement features. Aerodynamic performance as influenced by the grooves is optimized by evaluating alternative depths, orientations and shapes of the grooves to extend or enhance range to stall and possible engine surge. By using additive manufacturing, design limitations that may otherwise apply are avoided. For example, machining features into a casing carries limitations associated with the ability to efficiently remove material. Designs may be created using computer aided design software and evaluated using computational fluid dynamics software tools. Development parts may be fabricated using additive manufacturing and tested in an operating environment. Iterations of design, evaluation and testing may be carried out efficiently using additive manufacturing.

When the stall enhancement feature design meets aerodynamic stall margin, efficiency and mechanical requirements, the process 121 proceeds to integration/interfacing 123. The casing treatment with stall enhancement features is integrated into the engine's shroud around the rotor section including attachment features and segment interfaces. Manufacturability is balanced with a need to ensure the segments with casing treatment are securely contained. For example, interlocking structure may be used to prevent segment shifting, such as during surge. In addition, features may be formed by additive manufacturing to prevent leakage between the segments during engine operation.

The process 121 proceeds to defining 124 the specifics of the additive manufacturing process. For example, the type of additive manufacturing is selected. The current embodiment uses DMLS due to its applicability to forming complex geometries for parts with strength and durability. In addition, DMLS may be used to form the fine details of the casing treatment designs with high accuracy and quality. The build orientation of the segments is determined. The need for build supports and their structure is defined. Iterations of test builds may be carried out to choose a final orientation and support arrangement. The build arrangement is defined including determining whether segments will be manufactured individually or with several on a common build plate. Evaluations 125 are carried out to maximize weight reduction, manufacturing time and cost. For example, voids may be designed into the segments to reduce weight and material use. Test build iterations may be carried out to minimize support structure volume. Any potential for material collapse during build is evaluated.

The process 121 includes determining 126 whether weight or cost reductions may be made. For example, whether segment width or thickness may be reduced. When the determination is positive, the process 121 proceeds to evaluating redesign 128 of the stall enhancement features. For example, the size or orientation of grooves or passageways may be changed. The stall enhancement feature design is evaluated to ensure it meets aerodynamic stall margin, efficiency and mechanical requirements. When the redesign is complete, the process 121 proceeds through steps 123-126 again. Any number of iterations of steps 123-128 may be carried out to finalize the design. When the determination 126 is negative, the design is released 127 and manufacturing may begin. Providing an optimal shape and disposition of the grooves 92 is simplified through the use of additive manufacturing processes, which lowers manufacturing cost and fabrication complexity. In addition, using additive manufacturing processes enables forming the grooves with the shape that is determined to be optimized, including complex shapes.

Figure 6:
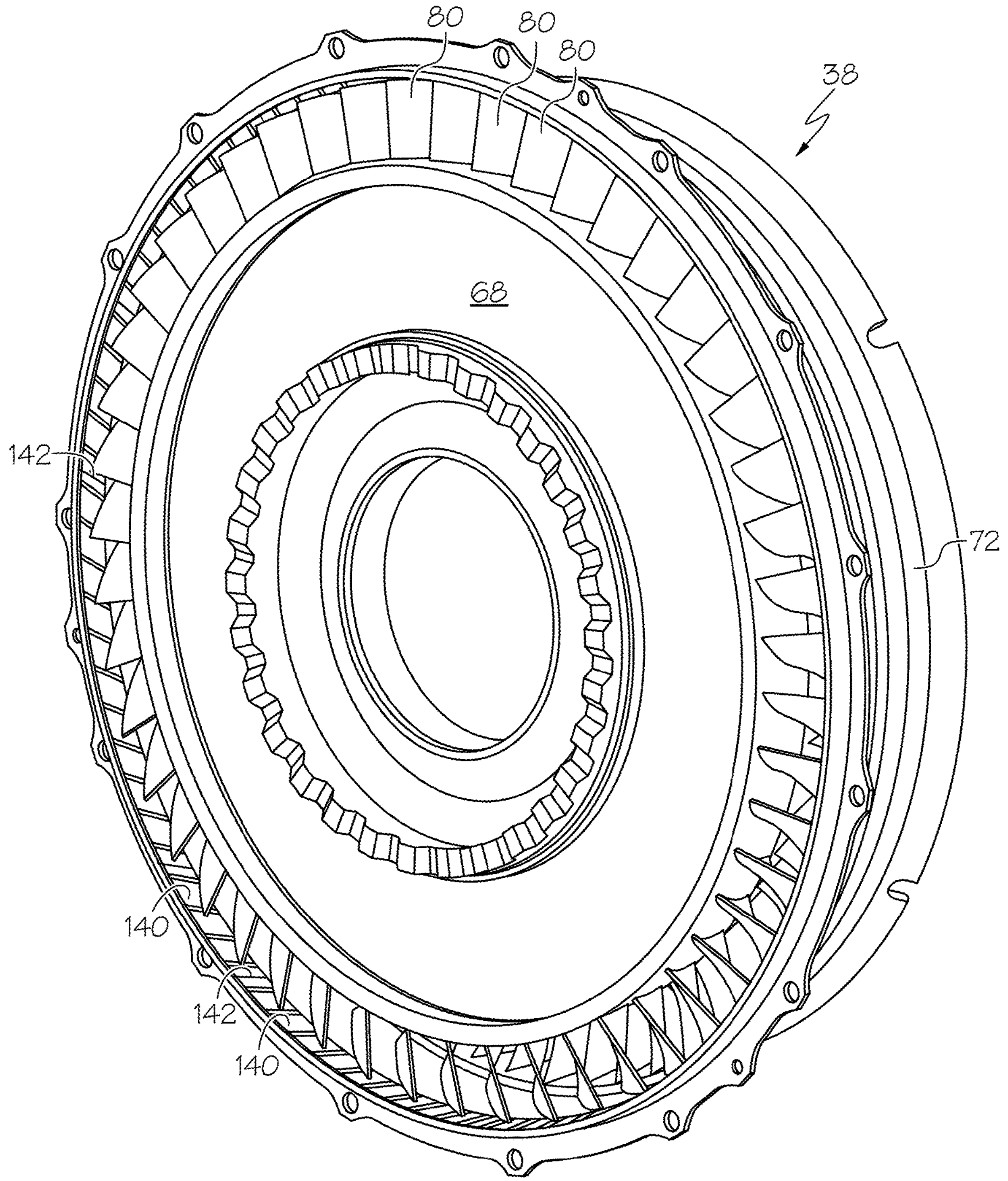
FIG. 6 is a perspective view of a rotor and casing, according to an exemplary embodiment.
Figure 7:
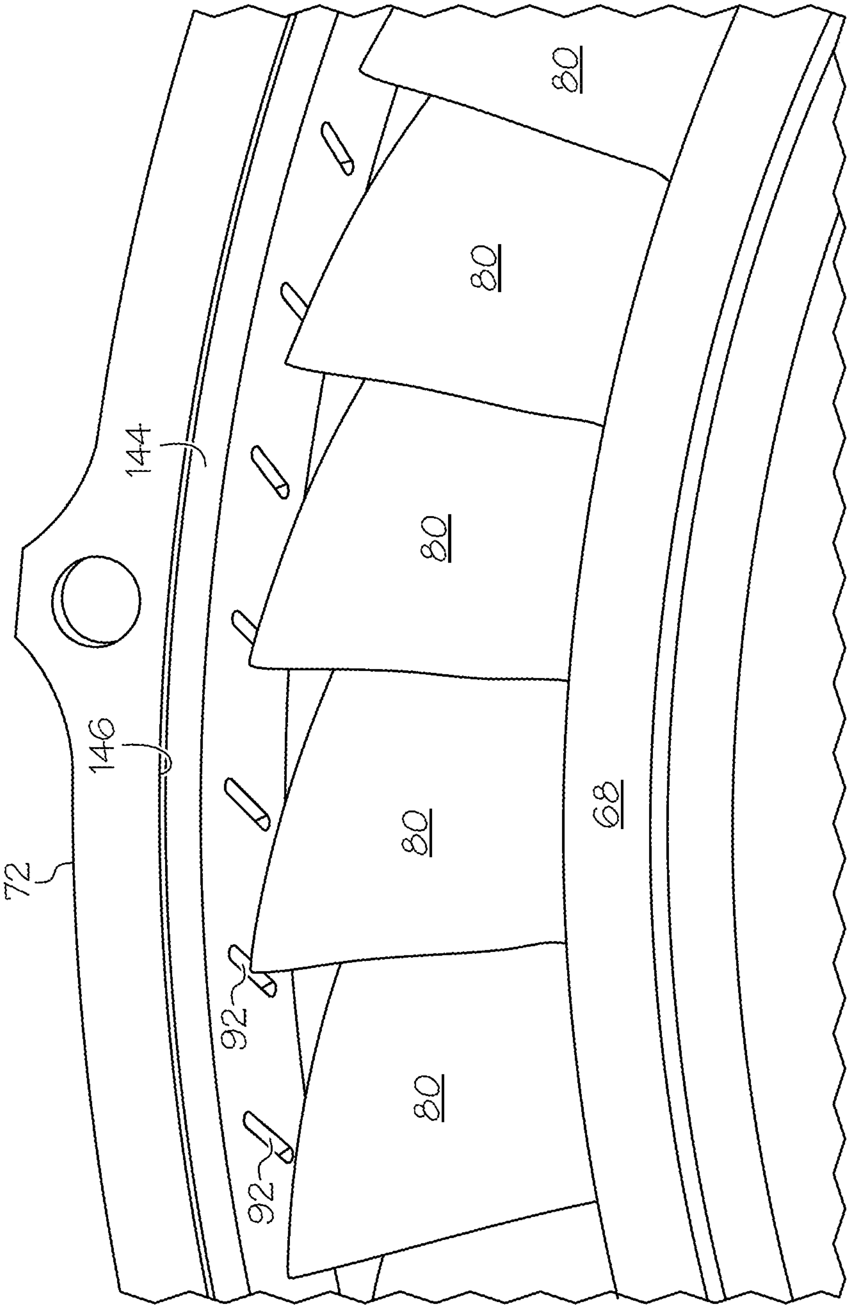
FIG. 7 is a fragmentary perspective view of a rotor and casing, according to an exemplary embodiment.

Referring to FIG. 6, the area of the compressor rotor 68 at the compressor section 38 is shown removed from the engine 22. The rotor 68 includes the blades 80 and is disposed within the casing 72. The grooves 92 are spaced from one another and disposed around the entire perimeter of the casing 72. The grooves 92 are formed in a number of segments 140 that abut one another at joints 142 and that are formed using the process 121. Together, the segments 140 form a ring 144 that extends completely around the rotor 68 and that is fit into the casing 72. The ring segments 140 are individually fabricated using an additive manufacturing process such as DMLS to form complex axial skewed and inclined grooves 92 of any shape. As shown in FIG. 7, the grooves 92 extend into the ring 144 which is separate from and fitted into an annular cavity 146 in the casing 72. Pitch of individual blades of the rotor 68 is the preferred minimum circumferential length of each segment 140.

Figure 8:
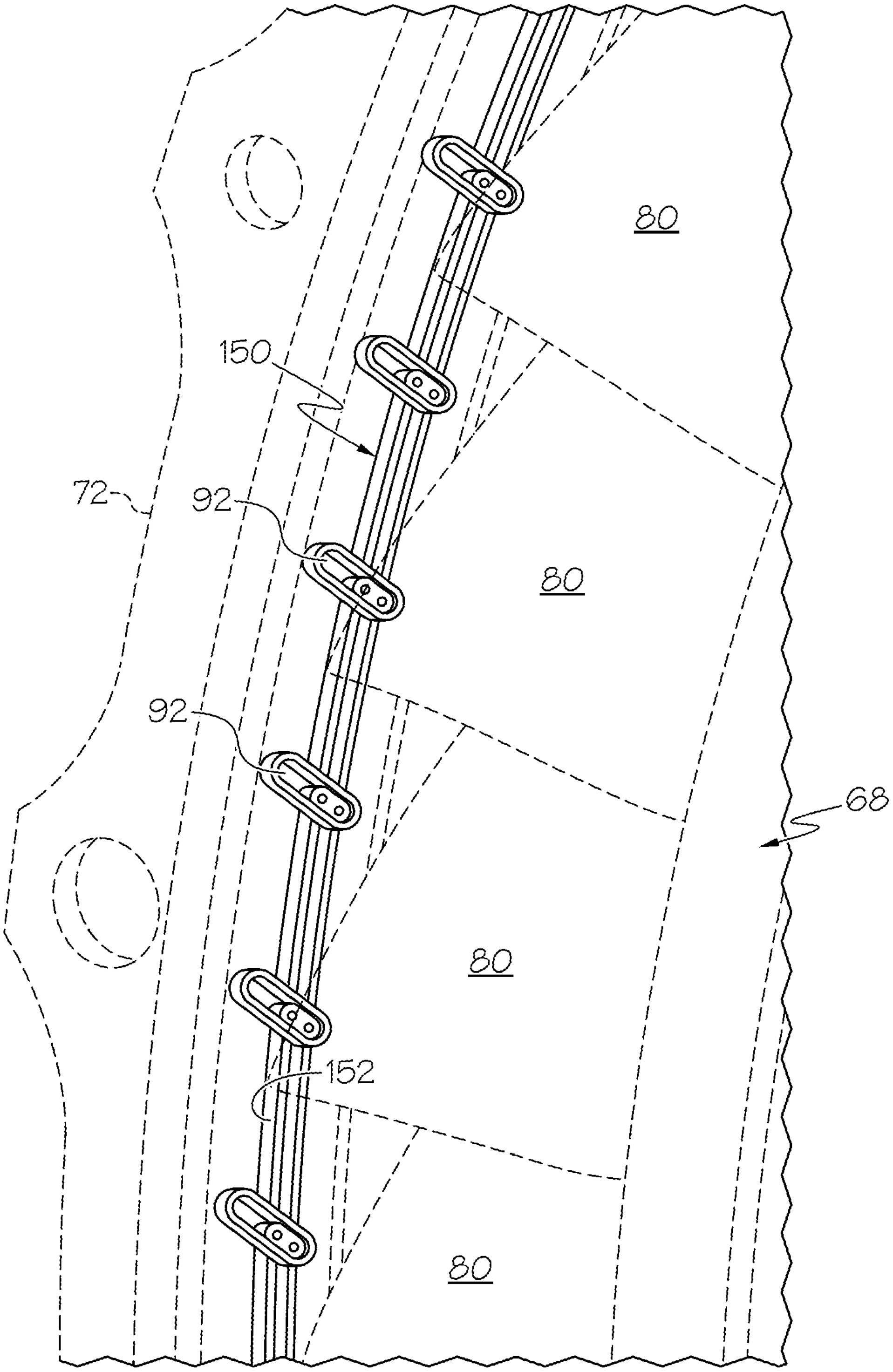
FIG. 8 is a fragmentary perspective view of a rotor and casing showing a manifold, according to an exemplary embodiment.

In a number of embodiments as illustrated in FIG. 8, the grooves 92 are an integrally formed part of a manifold 150 formed in the ring 144, and specifically in the segments 140. The manifold 150 includes an annular channel 152 that is embedded in the ring 144 and encircles the rotor 68. The channel 152 joins with each of the grooves 92 to balance their internal pressures to assist in attenuating surge conditions by allowing for additional aft to forward flow communication to improve range to stall. DMLS is beneficial in forming both the grooves 92 and the channel 152 during a build and in forming the internal channel 152 as an unsupported structure. The diameter of the channel 152 may be limited to approximately 8 mm for proper formation, or a non-circular cross section is used for larger cross sections.

Figure 9:
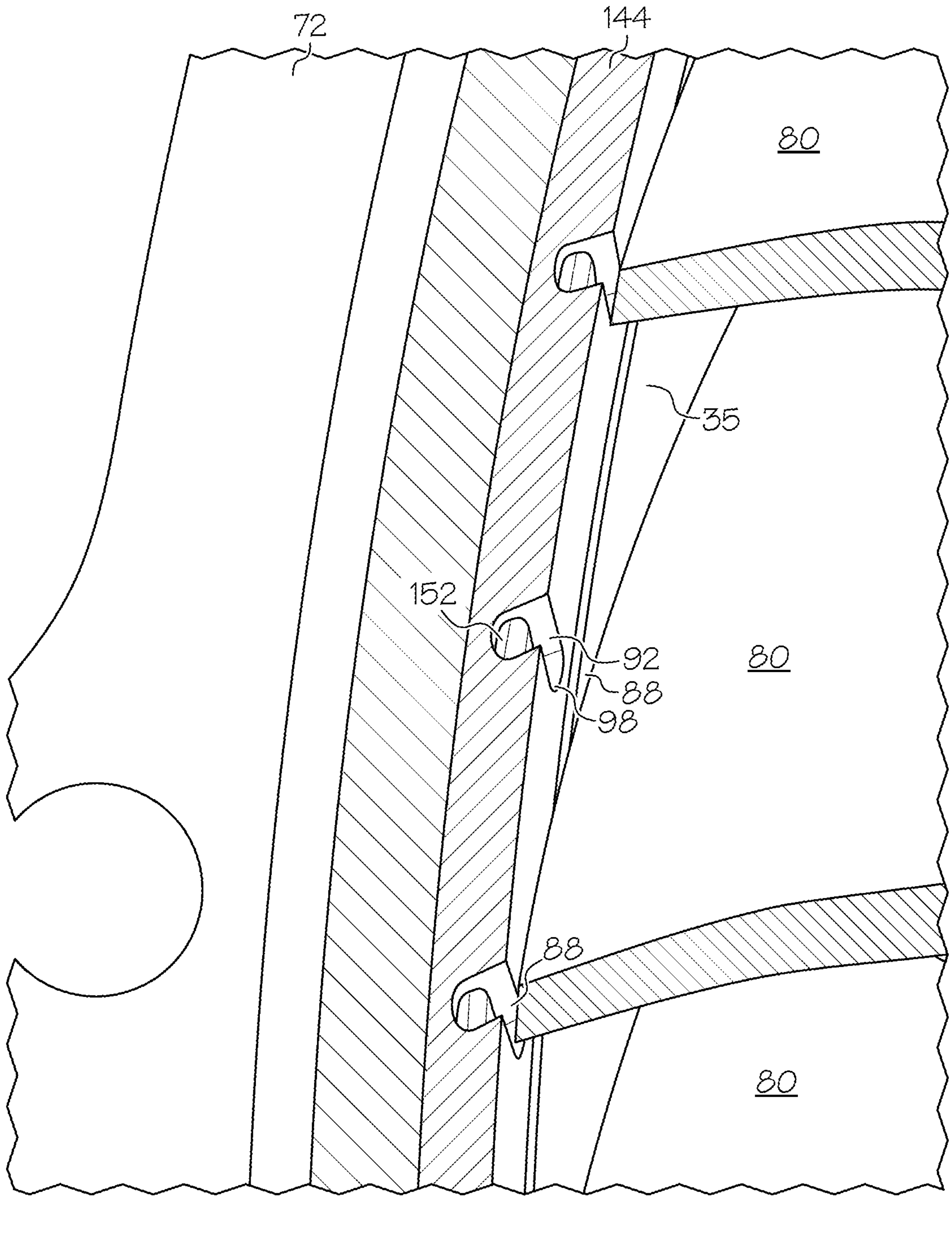
FIG. 9 is a fragmentary perspective view of a rotor and casing showing grooves, according to an exemplary embodiment.
Figure 10:
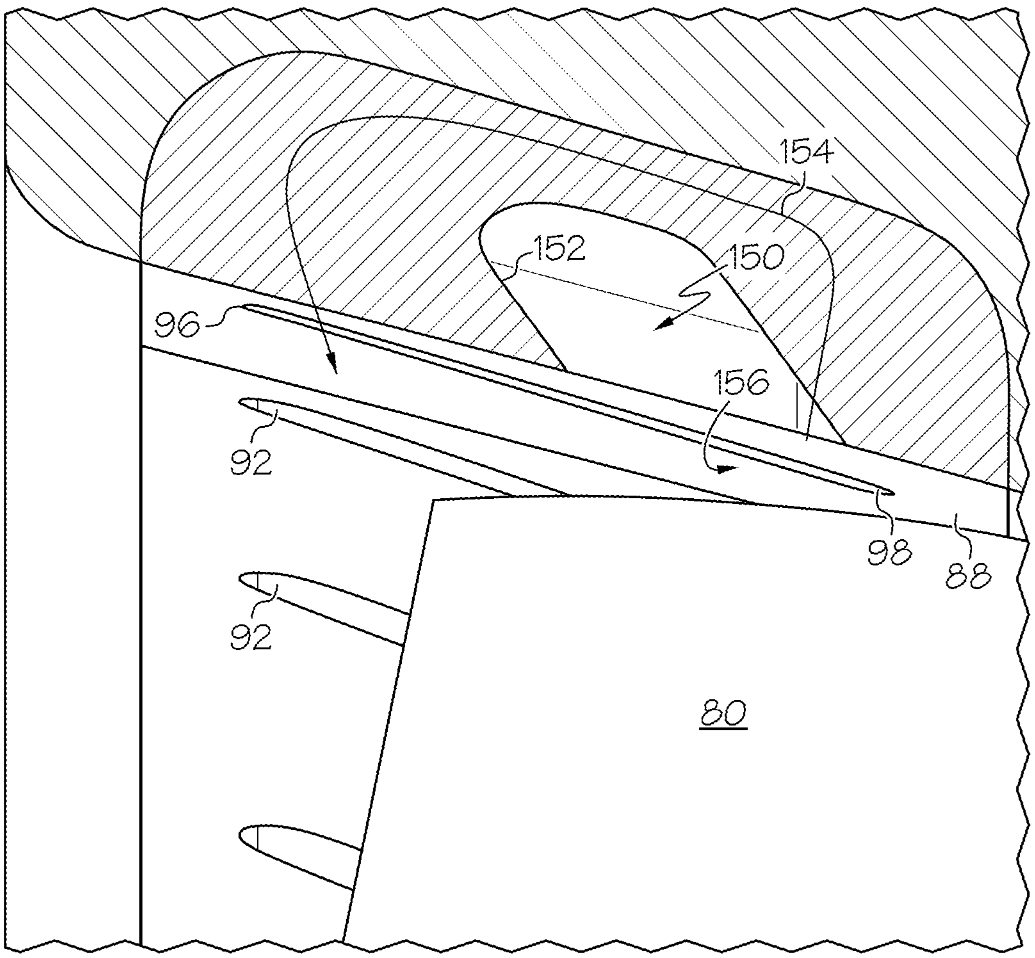
FIG. 10 is a fragmentary, sectional, perspective view of a rotor and casing, according to an exemplary embodiment.

As illustrated in FIG. 9, in a number of embodiments, the grooves 92 and the channel 152 join together with the grooves open into the gap 88 and the area of flow stream 35. The channel 152 is located proximate the downstream ends 98 (also shown in FIG. 10), and further inhibits the formation of counterflow in the gap 88 and thereby extend the range to stall. FIG. 10 shows the general direction of the flow 154 through the grooves 92 is from their aft to forward generally in a direction from their downstream end 98 to their upstream end 96 inhibiting reverse flow in the gap 88 and maintaining flow 156.

Figure 11:
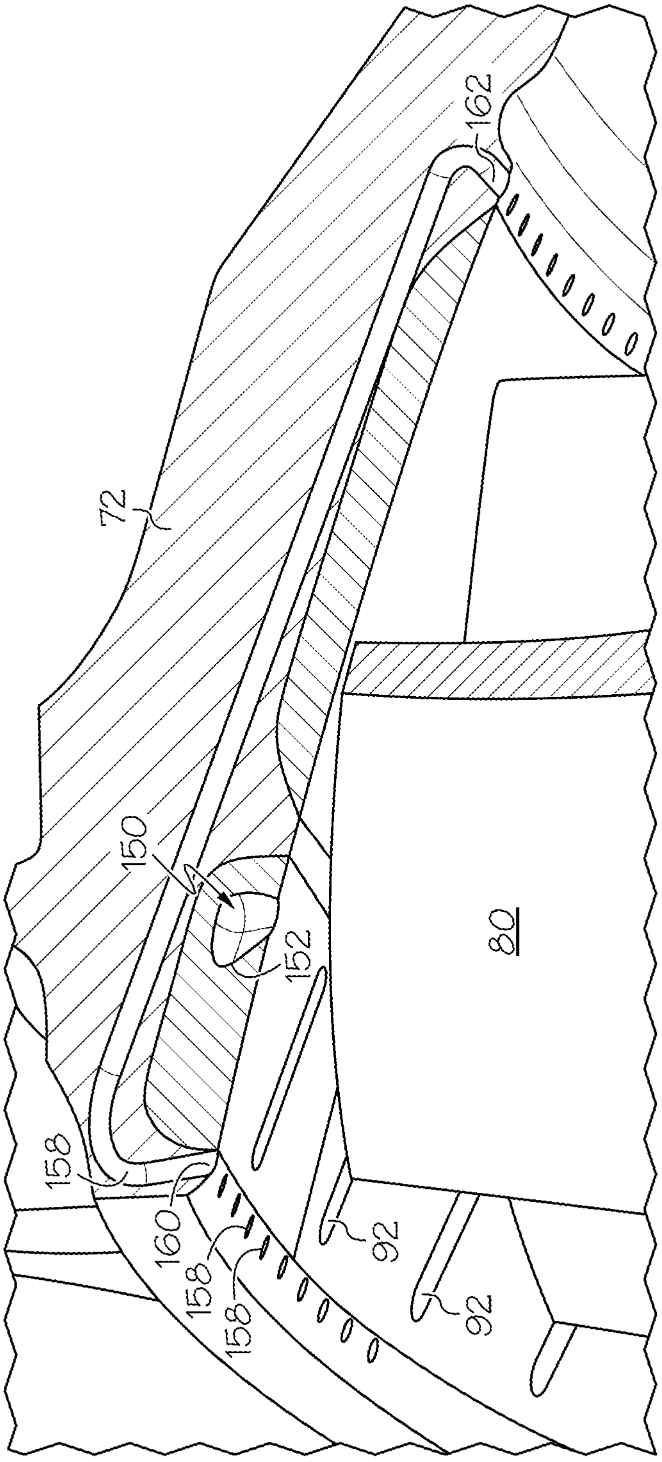
FIG. 11 is a fragmentary, sectional, perspective view of a rotor and casing showing a recirculation passage, according to an exemplary embodiment.
Figure 12:
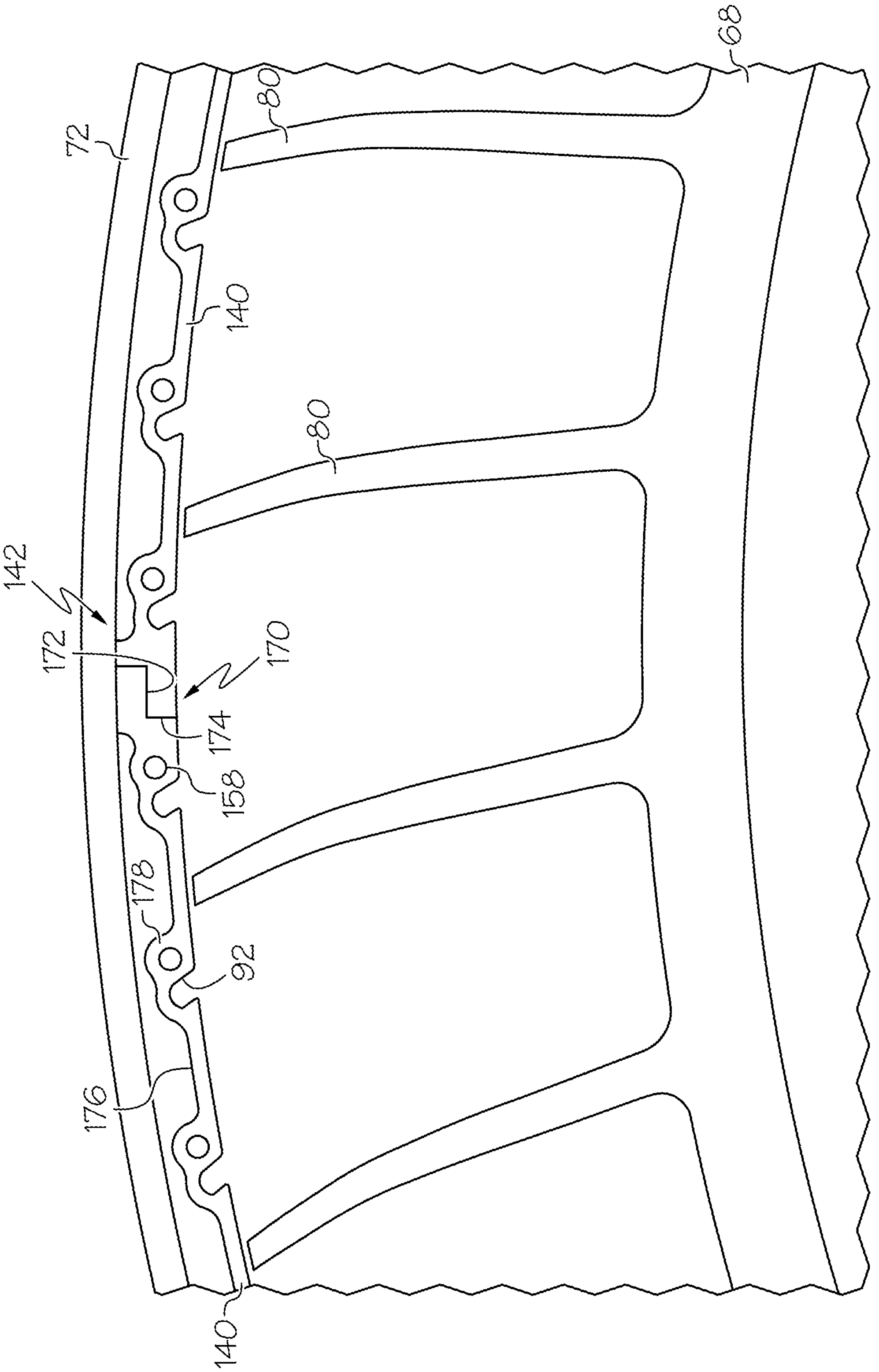
FIG. 12 is a fragmentary view of a rotor blade and casing area, according to an exemplary embodiment.

In a number of embodiments as illustrated in FIG. 11, recirculation passages 158 are defined in the casing 72 and distributed around its perimeter. Each recirculation passage 158 has a forward end 160 that opens forward of the leading edge of the rotor 68 and upstream from the grooves 92. Each recirculation passage 158 has a rearward end 162 that opens downstream from the rotor 68. The recirculation passages 158 further enhance range to stall. In other embodiments, the forward end 160 of each recirculation passage 158 may open into the manifold 150 or into a groove 92. Flow will move from the high pressure rearward end 162 to the lower pressure forward end 160. As shown in FIG. 12, the segments 140 abut one another at the joint 142 with retention and sealing features 170. The segment 140 interlock with a rabbet 172 at the end of one, that mates with a cantilevered segment 174 of the other. The rabbet 172 is a step-like area at the inward facing corner of the one segment 140 and the cantilevered segment 174 extends into the step-like area a sufficient distance for retention and sealing. It should be understood that each segment 140 will have a rabbet 142 at one of its ends and a cantilevered segment at its other end for joining a number of the segments 140 in a ring. The retention and sealing features 170 may be formed with their respective segment 140 during additive manufacturing. Each segment 140 includes a void 176 formed on its side opposite the blades 180 and facing the casing 72. The voids 176 are closed by the casing 72. The void 176 is maximized to reduce material use and weight. A wall 178 between the void 176 and the grooves 92/passages 158 is maintained at a minimum thickness for self-support during additive manufacturing.

Through the embodiments disclosed herein increased performance is achieved with improved range to stall through the inclusion of generally axially extending grooves and/or recirculation passages. Forming the casing with the grooves is accomplished using an additive manufacturing process such as DMLS. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of manufacturing a rotor system comprising:

designing a casing with stall enhancement features;

fabricating a rotor with a number of blades, each blade having a tip a leading edge and a trailing edge, the rotor configured to rotate in a flow stream;

constructing the casing to fit over the rotor so that tips of the blades are configured to pass proximate the casing when the rotor rotates about an axis in a rotation direction with the blades disposed at a blade angle relative to the axis so that the leading edges are disposed before the trailing edges in the rotation direction;

forming the casing with a section formed separate as a number of segments and to channel the flow stream across the rotor;

forming, by additive manufacturing, the number of segments to define a series of grooves in the casing, wherein the grooves extend into the segments of casing radially outward relative to the axis and are oriented to extend longitudinally at an acute angle relative to the axis to provide stall enhancement, the acute angle being negative relative to the blade angle and in an opposite direction relative to the axis as compared to the blade angle, to maximize a distance through which the blades traverse the grooves;

optimizing aerodynamic performance of the grooves to avoid stall;

assembling the rotor in the casing with the grooves extending a distance upstream from a leading edge of the blades and over at least a portion of the blade tips so that the blade tips are configured to pass across the grooves when the rotor rotates;

forming the section in a ring made up of the number of segments;

defining, by the casing, a cavity into which the ring is fit with the ring having a surface facing the blades and defining a gap between the surface and the blades;

defining, by the ring, a plurality of recirculation passages that each extend between a first end opening to the flow stream upstream from the rotor and a second end opening to the flow stream downstream from the rotor;

forming the segments to include voids opposite the surface and facing the casing, with the voids closed by the casing and the ring; and forming the slots and the plurality of recirculation passages in the ring and spaced from the void by a wall.

2. The method of claim 1, comprising fitting the segments to the casing to encircle the rotor.

3. The method of claim 2, comprising forming the segments with interlocking retention and sealing features.

4. The method of claim 2, comprising forming, integrally during the additive manufacturing, a manifold in the section, wherein the manifold includes the grooves and an annular channel connecting with each of the grooves.

5. The method of claim 1, wherein the rotor is configured to rotate in a rotation direction and comprising forming each groove to extend into the casing from an entry to a bottom and so that each groove is disposed at an incline so that the entry is offset against the rotation direction relative to the bottom.

6. The method of claim 1, wherein optimizing the aerodynamic performance comprises evaluating alternative depths, orientations and shapes of the grooves to maximize stall margin gain and to avoid surge.

7. The method of claim 1, comprising assembling the rotor system as a compressor in a gas turbine engine.

8. The method of claim 1, comprising:

determining whether the casing meets aerodynamic stall margin, efficiency and mechanical requirements;

determining whether the casing results in maximized weight and cost; and when either determination is negative, redesigning the casing.

9. A rotor system comprising:

a rotor with blades that extend to tips, the rotor configured to rotate about an axis in a rotation direction, wherein the blades have leading edges and trailing edges and are disposed at a blade angle relative to the axis so that the leading edges are disposed before the trailing edges in the rotation direction;

a casing fit over the rotor so that the tips are configured to pass proximate the casing when the rotor rotates, the casing configured to channel a flow stream across the rotor, wherein the casing includes a section that is formed separate as a number of segments;

the segments define a series of grooves, wherein the grooves extend into the segments in a radially outward direction relative to the axis, the grooves oriented to extend longitudinally at an acute angle relative to the axis, the acute angle being negative relative to the blade angle and in an opposite direction relative to the axis as compared to the blade angle, to maximize a distance through which the blades traverse the grooves, wherein the grooves extend a distance upstream from a leading edge of the blades and over at least a portion of the blade tips so that the blade tips are configured to pass across the grooves when the rotor rotates, wherein the section comprises a ring made up of the number of segments, wherein the casing defines a cavity into which the ring is fit with the ring having a surface facing the blades and defining a gap between the surface and the blades, wherein the ring defines a plurality of recirculation passages that each extend between a first end opening to the flow stream upstream from the rotor and a second end opening to the flow stream downstream from the rotor, wherein the segments include voids opposite the surface and facing the casing, wherein the voids are closed by the casing and the ring, and wherein the slots and the plurality of recirculation passages are formed in the ring and spaced from the void by a wall.

10. The rotor system of claim 9, wherein the section comprises built-up additive manufactured material.

11. The rotor system of claim 9, wherein the segments include integral interlocking features and fit to the casing to encircle the rotor.

12. The rotor system of claim 9, wherein the section defines a manifold comprising the grooves and an annular channel connecting with each of the grooves.

13. The rotor system of claim 9, wherein the rotor rotates in a rotation direction, wherein each groove extends into the casing from an entry to a bottom and is disposed at an incline in the rotation direction so that the entry is offset against the rotation direction relative to the bottom.

14. The rotor system of claim 9, wherein the rotor has an upstream side with a leading edge of the blades and a downstream side with a trailing edge of the blades, wherein each groove spans across the leading edge in the axial direction.

15. The rotor system of claim 14, wherein each groove has an upstream end and a downstream end, wherein the upstream end is disposed upstream from the leading edge in the axial direction and the downstream end is disposed between the leading edge and the trailing edge in the axial direction.

16. A method of manufacturing a rotor system for an engine comprising:

designing a casing with stall enhancement features;

fabricating a rotor with a number of blades, each having a leading edge, a trailing edge and a tip, the rotor configured to rotate in a flow stream of the engine;

constructing the casing to fit over the rotor so that blade tips of the rotor are configured to pass proximate a segmented section of the casing when the rotor rotates about an axis, and so that the casing channels the flow stream across the rotor, the rotor rotates in a rotation direction with the blades disposed at a blade angle relative to the axis so that the leading edges are disposed before the trailing edges in the rotation direction;

forming the casing with a segmented section formed separate as a number of segments and to channel the flow stream across the rotor;

determining a size, orientation and shape of grooves and recirculation passages to provide an aerodynamic performance that avoids stall and surge, with the grooves extending a distance upstream from the leading edges of the blades and over at least a portion of the blade tips so that the blade tips are configured to pass across the grooves when the rotor rotates;

forming the segmented section of the casing by additive manufacturing, wherein the segmented section includes the recirculation passages that extend into the casing radially outward from the axis, and forming the grooves to extend into the segments in a radially outward direction relative to the axis and are oriented to extend longitudinally at an acute angle that is negative relative to the blade angle and in an opposite direction relative to the axis as compared to the blade angle, to maximize a distance through which the blades traverse the grooves;

assembling the rotor in the segmented sections of the casing with the recirculation passages in the casing so that each recirculation passage extends between a first end opening to the flow stream upstream from the rotor and a second end opening to the flow stream downstream from the rotor;

forming the section in a ring made up of the number of segments;

defining, by the casing, a cavity into which the ring is fit with the ring having a surface facing the blades and defining a gap between the surface and the blades;

forming the segments to include voids opposite the surface and facing the casing, with the voids closed by the casing and the ring; and forming the slots and the recirculation passages in the ring and spaced from the void by a wall.

* * * * *